(12) United States Patent
Kim et al.

(10) Patent No.: US 8,273,821 B2
(45) Date of Patent: Sep. 25, 2012

(54) ADHESIVES COMPOSITION COMPRISING MIXTURES OF MULTI-BLOCK COPOLYMERS

(75) Inventors: Jae Yun Kim, Daejeon (KR); Ok Kil Mun, Deajeon (KR); Eun Kyung Noh, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 310 days.

(21) Appl. No.: 12/626,851

(22) Filed: Nov. 27, 2009

(65) Prior Publication Data

US 2011/0105672 A1 May 5, 2011

(30) Foreign Application Priority Data

Nov. 3, 2009 (KR) .................. 10-2009-0105639

(51) Int. Cl.
*C08G 61/00* (2006.01)
*C08G 61/12* (2006.01)
*C08L 53/02* (2006.01)
*C09J 153/02* (2006.01)
*C08J 3/18* (2006.01)

(52) U.S. Cl. ........ 524/505; 524/476; 524/500; 524/502; 524/515; 524/525; 524/526; 525/50; 525/88; 525/89; 525/95; 525/191; 525/241

(58) Field of Classification Search .................. 524/500, 524/505, 515, 525, 526; 525/50, 88, 89, 525/95

See application file for complete search history.

(56) References Cited

U.S. PATENT DOCUMENTS

| | | |
|---|---|---|
| 3,265,765 A | 8/1966 | Anaheim et al. |
| 4,163,764 A | 8/1979 | Nash |
| 4,603,155 A | 7/1986 | Muramori et al. |
| 4,874,821 A | 10/1989 | Agostinis et al. |
| 5,583,182 A | 12/1996 | Asahara et al. |
| 6,384,138 B1 * | 5/2002 | Jacob et al. ............... 525/89 |
| 2002/0077420 A1 * | 6/2002 | Chiba et al. ............... 525/89 |

FOREIGN PATENT DOCUMENTS

| | | |
|---|---|---|
| EP | 0669350 | 8/1995 |
| KR | 100225665 | 3/2000 |
| KR | 1020070110432 | 11/2007 |
| WO | 00/14170 | 3/2000 |

\* cited by examiner

*Primary Examiner* — Ling Choi
*Assistant Examiner* — Darcy D Laclair
(74) *Attorney, Agent, or Firm* — Lowe Hauptman Ham & Berner, LLP

(57) ABSTRACT

The present invention relates to an adhesive composition comprising a mixture of multi-block copolymers, in particular, an adhesive composition comprising a block copolymer represented by Formula 1, a hydrocarbon adhesive resin and a plasticizer. The adhesive composition according to the present invention can be easily processed due to its low melting point and shows improved adhesive properties such as loop tack, 180° peel strength and holding power.

9 Claims, No Drawings

ADHESIVES COMPOSITION COMPRISING MIXTURES OF MULTI-BLOCK COPOLYMERS

CROSS-REFERENCE TO RELATED APPLICATION

This application claims under 35 U.S.C. §119(a) the benefit of Korean Patent Application No. 10-2009-0105639 filed Nov. 3, 2009, the entire contents of which are incorporated herein by reference.

FIELD OF THE INVENTION

The present invention relates to an adhesive composition comprising a mixture of multi-block copolymers.

DESCRIPTION OF THE PRIOR ART

Adhesive compositions comprising styrene-based block copolymers as thermoplastic elastomer components are well known in the art. These compositions are for instance used as PSA (pressure sensitive adhesive) for industrial tapes, packaging tapes and labels, and in multipurpose hot-melt adhesive compositions which may be used to bond or construct articles in the manufacture of disposable soft goods, such as diapers, feminine care articles, surgical drapes and the like. Generally, a poly(styrene)-poly(isoprene)-poly(styrene) block copolymer (S-I-S) and a poly(sterene)-poly(butadiene)-poly(styrene) block copolymer (S-B-S) are widely used in these adhesive compositions.

Unlike other SBSs which require their own mechanical properties, there are two factors in the SBS to be used as an adhesive, that is, viscosity as processing property during the preparation of adhesives and adhesiveness after preparation. Therefore, SBS must be well melt-mixed with other components such as an adhesive resin, a plasticizer (oil) and the like and exhibit excellent heat stability and low viscosity, which is favorable for the adhesive processing. Among the adhesive properties, loop tack, holding power and 180° peel strength are important, and such properties can be varied depending on a molecular structure and a molecular weight of SBS.

U.S. Pat. No. 3,265,765 discloses a method of preparing hot-melt adhesives by using traditional linear triblock copolymer SBS. Although such a block copolymer shows high holding power, its processing and adhesive properties are very poor, and thereby, there are many limitations on the application thereof.

U.S. Pat. No. 4,163,764 discloses the use of linear or radial SBS which is prepared by using various coupling agents as a hot-melt adhesive. Such an SBS shows improved processing properties, but their adhesive properties are still poor similar to the prior art linear triblock SBS. In order to improve the processability and adhesive properties, it has been developed SBS containing tapered blocks instead of the complete block copolymer. U.S. Pat. No. 4,874,821 discloses SBS having a styrene/butadiene-styrene-butadiene block structure where a tapered block exists at an initial styrene/butadiene block. U.S. Pat. No. 4,603,155 discloses a multi-block polymer having a styrene-butadiene/styrene-butadiene/styrene-butadiene-styrene structure where two or more tapered blocks exist in the center of a butadiene block. Such a tapered block SBS shows high processability and adhesive properties, but it takes a long time to polymerize them. Further, since the block content depends on polymerization temperature, initiator and monomer concentrations, the amount of a reaction accelerator (Lewis base), etc., its industrial application is very difficult.

SIS and SBS for adhesives can be used alone, but their mixtures and S-(B-I)-S which is prepared by polymerizing butadiene and isoprene at the part of conjugated diene of the block copolymer can be used.

WO 00/14170 discloses an adhesive composition based on an elastomeric component comprising (I) an SIS block copolymer and (II) an SBS block copolymer, and on a tackifying component comprising (III) a first hydrocarbon resin compatible with the SIS block copolymer and (IV) a second hydrocarbon resin compatible with the SBS block copolymer.

In EP Pat. No. 669350 and U.S. Pat. No. 5,583,182, adhesive compositions have been described wherein the styrene-based block copolymer is a block copolymer of an S-B-I-S type, an $(S-B-I)_{n-x}$ type or an $(S-I-B)_{n-x}$ type.

However, the prior art compositions have some limitations to satisfy processability, adhesive properties and industrial applicability at the same time.

SUMMARY OF THE INVENTION

The present invention is conceived to solve the aforementioned problems in the prior art. An object of the present invention is to provide an adhesive composition comprising a block copolymer represented by Formula 1 which can be easily processed due to its low melting point and shows improved adhesive properties such as loop tack, 180° peel strength and holding power.

In order to achieve the above objective, one embodiment of the present invention relates to an adhesive composition having good processability, high productivity and improved adhesive properties by comprising a block copolymer represented by Formula 1, a hydrocarbon adhesive resin and a plasticizer.

DETAILED DESCRIPTION OF THE INVENTION

According to an aspect of the present invention for achieving the objects, there is provided an adhesive composition comprising:

a block copolymer consisting of a triblock (A-B-A') and a diblock (B'-A') represented by the following Formula 1,
a hydrocarbon adhesive resin, and
a plasticizer,

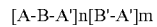

[A-B-A']n[B'-A']m           [1]

wherein A and A' are vinyl aromatic monomer polymers,
B and B' are conjugated diene polymers,
n and m are independently a weight average mixed ratio of a triblock [A-B-A'] and diblock [B'-A'] (here, n+m=100 weight %, and n≧m, m≧1),
wherein the weight average molecular weight of the diblock is smaller than that of the triblock and is larger than that of A constituting the triblock,
wherein the molecular weight distribution (MWD) of the diblock is larger than 1.1 and smaller than 2.0, wherein the diblock has two or more peak molecular weight (Mp).

Advantageous Effects

If the block copolymer of Formula 1 according to the present invention is applied to a hot-melt adhesive, its melting viscosity becomes low, thereby saving time and energy for processing an adhesive and improving the processability thereof. Therefore, the adhesive composition comprising the block copolymer according to the present invention can be effectively used in the manufacture of a hot-melt adhesive showing good adhesiveness.

Best Mode

Hereinafter, the present invention will be described in detail with reference to the accompanying drawings. Throughout the drawings, like reference numerals are used to designate like elements.

The present invention relates to a hot-melt adhesive composition which is characterized by comprising:
a block copolymer represented by Formula 1,
an adhesive resin, and
a plasticizer,

[A-B-A']n[B'-A']m     [1]

wherein A and A' are vinyl aromatic monomer polymers,
B and B' are conjugated diene polymers,
n and m are independently a weight average mixed ratio of a triblock [A-B-A'] and a diblock [B'-A'] (here, n+m=100 weight %, and n≧m, m≧1),
wherein the weight average molecular weight of the diblock is smaller than that of the triblock but larger than that of A constituting the triblock,
wherein the molecular weight distribution (MWD) of the diblock is larger than 1.1 and smaller than 2.0, wherein the diblock has two or more peak molecular weight (Mp).

A of the triblock copolymer represented by Formula 1 is a vinyl aromatic monomer and can be selected from the group consisting of styrene, α-methylstyrene, p-methylstyrene, o-methylstyrene, p-tert-butylstyrene, dimethylstyrene, vinyltoluene, vinylxylene, diphenylethylene, vinyl naphthalene and mixtures thereof. It is preferable to use styrene.

B and B' are conjugated dienes which can be selected from the group consisting of butadiene, isoprene and mixtures thereof.

The polymerization of the triblock copolymer (Formula 1) containing the diblock copolymer can be carried out by polymerizing A-B-A' and B'-A' simultaneously in a single reactor or polymerizing A-B-A' and B'-A' in a separate reactor, respectively, followed by mixing them.

First, the simultaneous polymerization of the triblock and diblock can be carried out as follows: a vinyl aromatic monomer (A) is polymerized by using an organic lithium initiator under the presence of an inactive hydrocarbon solvent. After the polymerization is completed, during the reaction of a conjugated diene, an additional organic lithium initiator is added to the reaction mixture fractionally more than twice. Alternatively, an additional organic lithium initiator and a conjugated diene are added to the reaction mixture fractionally in turn more than twice, followed by adding thereto a vinyl aromatic monomer (A'). It is also possible to polymerize the same by initiating the reaction of a conjugated diene gradually by diluting the concentration of an additional organic lithium initiator and adding it slowly thereto using a measuring pump. After the polymerization is completed, the A-B-A' living polymer is mixed with a reaction terminator in the amount corresponding to the total organic lithium initiator added thereto, to thereby deactive the remaining activity of the polymer at its terminal end. The total amount of the organic lithium initiator can be regulated depending on a desired molecular weight of an A-B-A' triblock copolymer, and the molecular weight of A can be regulated by the organic lithium initiator added at the first stage. Further, it is able to polymerize B' having a different molecular weight depending on the amount of the organic lithium initiator added fractionally, and is possible to regulate the generation amount of a B'-A' polymer.

As described above, it is possible to polymerize an A-B-A' triblock copolymer and a B'-A' diblock copolymer simultaneously in a single reactor, or polymerize an A-B-A' triblock copolymer and a B'-A' diblock copolymer respectively in a separate reactor followed by mixing them. Here, the A-B-A' triblock copolymer can be polymerized by adding starting materials successively in order of A-B-A' according to a standard anion polymerization method. Alternatively, it can be polymerized by adding only A-B corresponding to the half of an A-B-A' molecular weight, followed by adding a divalent coupling agent. The B'-A' diblock copolymer can be polymerized by the following two methods.

First, an inactive hydrocarbon solvent and a conjugated diene are added to a reactor, and then, a part of an organic lithium initiator is added thereto to initiate the polymerization. Before the conjugated diene polymerization is completed, the rest of the organic lithium initiator is fractionally added to the reactor, thereby generating polymers in which B' has a different molecular weight. To thus polymerized living conjugated diene polymer is added a vinyl aromatic monomer (A') to stop the polymerization of B'-A', and then, a reaction terminator is added thereto, thereby completing the polymerization.

The alternative method of polymerizing a B'-A' diblock copolymer in a separate reactor is as follows: A' is polymerized in one reactor under the presence of an inactive hydrocarbon solvent, the living A' in which an anion is active is fractionally added to the reactor where an inactive hydrocarbon organic solvent and a conjugated diene are mixed, to thereby obtain a B'-A' diblock copolymer having more than two maximum peak molecular weights (Mp) (showing a shoulder-shape in GPC) and a wide molecular weight distribution (1.1<MWD<2.0). After the conjugated diene is consumed, a reaction terminator is added to complete the reaction.

Different from the simultaneous polymerization of A-B-A' and B'-A', in case of polymerizing the B'-A' block copolymer in a separate reactor according to the described two methods, A' of the A-B-A' triblock copolymer and A' of the B'-A' diblock copolymer may have a different molecular weight. However, the difference in the molecular weight of A' between the triblock copolymer and diblock copolymer can be adjusted by controlling the amount of the organic lithium initiator during the polymerization of a B'-A' diblock copolymer. The polymerization must be carried out so that the weight average molecular weight of B'-A' is larger than that of A but smaller than that of B-A'.

In the compound of Formula 1, the mixed ratio of A-B-A' and B'-A' is preferably in the range of 99:1 to 50:50, more preferably 95:5 to 70:30. Preferably, the weight average molecular weight of the A-B-A' triblock copolymer represented by Formula 1 has a range of 20,000 to 400,000, more preferably 8,000 to 40,000, and that of A has a range of 5,000 to 100,000, more preferably 8,000 to 40,000. Further, the content of the vinyl aromatic monomer in B'-A' is preferably in the range of 5 to 95 weight %, more preferably 10 to 70 weight %.

Each step of the polymerization can be performed both under constant temperature conditions and insulating conditions, but it is possible to preferably carry out the polymerization at a temperature ranging from −10 to 150° C., more preferably 10 to 110° C.

In order to improve a reaction rate of the polymerization and regulate the vinyl content in the conjugated diene polymer, it is possible to use a small amount of Lewis base as a polar compound. Here, suitable Lewis bases may be preferably ethers such as tetrahydrofuran, diethylether, diethyleneglycol dimethylether and the like and tertiary amines such as N,N,N',N'-tetramethylethylenediamine, triethylamine and the like. The Lewis base can be used alone or in admixture thereof.

The hydrocarbon solvents suitable for the present invention may include hexane, heptane, cyclohexane, benzene, toluene and the like, and the alkyl lithium initiators suitable for the present invention may include n-butyllithium, sec-butyllithium and the like.

The reaction terminators added after the polymerization is completed can be common anion polymerization terminators, and examples thereof may include water, alcohols, organics-inorganics, halogenated forth group elements and the like.

In the block copolymer represented by Formula 1, the content and molecular weight distribution of B'-A' can be measured by using a gel permeation chromatography (GPC) or LALLS (Low Angle Laser Light Scattering) compensated with a standard polystyrene.

The hydrocarbon adhesive resins suitable for the adhesive composition of the present invention can be selected from the group consisting of aliphatic hydrocarbon resins such as modified C5 hydrocarbon resins (C5/C9 resin), styrenated terpene resins, wholly or partially hydrogenated C9 hydrocarbon resins, hydrogenated cyclic aliphatic hydrocarbon resins, hydrogenated aromatic modified cyclic aliphatic hydrocarbon resins and mixtures thereof. Preferable solid adhesive resins have a ring-and-ball softening point in the range of 90 to 105° C. and contains aromatic compounds in the range of 0 to 16%, more preferably 0 to 12%.

In the adhesive composition of the present invention, the hydrocarbon adhesive resins can be used preferably in the amount of 100 to 400 parts by weight, more preferably 200 to 300 parts by weight based on 100 parts by weight of the block copolymer represented by Formula 1. If the amount of the adhesive resin is lower than 100 parts by weight, its viscosity becomes too high, resulting in processability problem. If that exceeds 400 parts by weight, there is a problem in lowering heat stability at a high temperature.

Suitable plasticizers for the present invention is paraffin-based or naphthene-based (carbon aromatic distribution is lower than 5%, preferably 2%), having a glass transition temperature (Tg) of lower than −55° C. when measured with a differential scanning calorimetry (DSC). In particular, examples of the plasticizers may include low molecular weight polymers (30,000 g/mol or lower) such as olefin oligomers, liquid polybutene, liquid polyisoprene copolymers, liquid styrene-isoprene copolymers or liquid hydrogenated styrene-conjugated diene copolymers, vegetable oil and derivatives thereof, paraffin, microcrystalline wax and the like.

The plasticizer in the adhesive composition of the present invention can be used preferably in the amount of 100 to 200 parts by weight, more preferably 50 to 150 parts by weight based on 100 parts by weight of the block copolymer represented by Formula 1. If the amount of the plasticizer is lower than 10 parts by weight, its viscosity becomes too high, which is unfavorable in terms of processability. If that exceeds 200 parts by weight, there is a problem in lowering adhesive properties.

In the conventional adhesive compositions, an antioxidant is used in the amount of 0 to 3 parts by weight, more preferably 1 part by weight or less based on 100 parts by weight of the block copolymer represented by Formula 1 to improve heat stability and color tone of an adhesive. For the present invention, primary antioxidants such as hindered phenol, secondary antioxidants such as phosphate derivatives or mixtures thereof can be used.

The preparation of an adhesive and measurement of viscosity and adhesive properties thereof may be carried out according to conventional methods well-known in the art.

First, after the polymerization of the block copolymer represented by Formula I is completed, the reaction mixture is subjected to steam stripping to remove the solvent. The block copolymer crumb containing water is then dried at 120° C. by using a roll mill and chopped into a size of 0.5 cm×0.5 cm or less.

According to the conventional methods, the block copolymer of Formula I, an adhesive resin and a plasticizer are added to a stainless container and stirred at a temperature of 140 to 150° C. for 3 hours, to thereby obtain completely hot-melt sticky adhesives.

Adhesive properties are measured according to conventional methods well-known in the art. A softening point is measured according to ASTM E28 standard test methods and is defined as a temperature at which a disk of the sample held within a horizontal ring is forced downward a distance of 1 inch under the weight of a steel ball as the sample is heated at 5° C./min in a glycerin bath. Loop tack is measured by using a loop tack tester described in ASTM D6195 in which a tape sample with a width of 1 inch is made into a loop shape and a stainless steel plate is used as an adhered subject. 180° peel strength is measured by attaching a tape sample in a 1-inch width to a stainless steel plate as an adhered subject, compressing it once with a roller having a 2 kg load at a rate of 300 mm/min, and measuring the force required to strip the one side of the sample from the adhered subject at an angle of 180° at the same rate. Holding power is determined by attaching a sample in a 0.5-inch width to a stainless steel plate in a size of 0.5 inch×0.5 inch, compressing it according to the same method as described in the measurement of peel strength, hanging a weight having a 1 kg load on the sample, and then, measuring the time required to fall the weight therefrom.

The viscosity of an adhesive is measured as a Brookfield viscosity by using a rotational viscometer according to ASTM D-3236-78. A sample is placed in a RVTDV-II equipped with a Brookfield Thermocell and the hot-melt viscosity is measured by the torque required to rotate a spindle at a constant speed in a temperature range of 110° C. to 160° C.

MODE FOR INVENTION

Preparation Example

Synthesis of Block Copolymer

Preparation Example 1

Cyclohexane (1,000 g), tetrahydrofuran (0.15 g) and styrene (27 g) were added to a 2 L stainless reactor under nitrogen atmosphere. After the reactor was heated to 35° C., nbutyllithium 1.62 mmol was added thereto, and then, the reaction mixture was subjected to an adiabatic heat rise reaction. Five minutes after the maximum reaction temperature was reached, n-butyllithium (0.080 mmol) and butadiene (70 g) were successively added to the reaction mixture to perform a primary reaction. Next, n-butyllithium (0.202 mmol) and butadiene (42 g) were successively added thereto to perform a secondary reaction, followed by successively adding n-butyllithium (0.122 mmol) and butadiene (28 g), 20 thereby carrying out a tertiary reaction. After the butadiene reaction was completed, styrene (33 g) was added to the reaction mixture, to thereby terminate the polymerization. Finally, 2,6-di-t-butyl-4-methyl phenol (BHT) (2.03 mmol) was added to the reaction mixture, to thereby terminate the reaction.

GPC analysis revealed that a styrene-butadiene-styrene block copolymer (A-B-A') having a weight average molecular weight of 110,000 and a molecular weight distribution (MWD) of 1.031 was 81.0 weight %, and a butadiene-styrene block copolymer (B'-A') having a maximum peak molecular weight (Mp) of 93,000, 52,000 and 30,000, respectively, and a total molecular weight distribution (MWD) of 1.201 was 19.0 weight %.

H-NMR analysis revealed that the content of styrene was 30.2 weight %.

Preparation Example 2

Cyclohexane (1,000 g), tetrahydrofuran (0.15 g) and styrene (27 g) were added to a 2 L stainless reactor under nitrogen atmosphere. After the reactor was heated to 35° C., n-10 butyllithium (1.62 mmol) was added thereto, and then, the reaction mixture was subjected to an adiabatic heat rise reaction. Five minutes after the maximum reaction temperature was reached, n-butyllithium (0.041 mmol) and butadiene (56 g) were successively added to the reaction mixture to perform a primary reaction. Next, n-butyllithium (0.202 mmol) and butadiene (42 g) were successively added thereto to perform a secondary reaction, followed by successively adding n-butyllithium (0.162 mmol) and butadiene (42 g), thereby carrying out a tertiary reaction. After the butadiene reaction was completed, styrene (33 g) was added to the reaction mixture, to thereby terminate the polymerization. Finally, 2,6-di-t-butyl-4-methyl phenol (BHT) (2.03 mmol) was added to the reaction mixture, to thereby terminate the reaction.

GPC analysis revealed that a styrene-butadiene-styrene block copolymer (A-B-A') having a weight average molecular weight of 110,000 and a molecular weight distribution (MWD) of 1.039 was 80.3 weight %, and a butadiene-styrene block copolymer (B'-A') having a maximum peak molecular weight (Mp) of 93,000, 60,000 and 37,000, respectively, and a total molecular weight distribution (MWD) of 1.128 was 19.7 weight %.

H-NMR analysis revealed that the content of styrene was 30.3 weight %.

Preparation Example 3

Cyclohexane (1,000 g), tetrahydrofuran (0.15 g) and styrene (27 g) were added to a 2 L stainless reactor under nitrogen atmosphere. After the reactor was heated to 35° C., n-butyllithium (1.62 mmol) was added thereto, and then, the reaction mixture was subjected to an adiabatic heat rise reaction. Five minutes after the maximum reaction temperature was reached, n-butyllithium (0.121 mmol) and butadiene (112 g) were successively added to the reaction mixture to perform a primary reaction. Next, n-butyllithium (0.162 mmol) and butadiene (7 g) were successively added thereto to perform a secondary reaction, followed by successively adding n-butyllithium (0.121 mmol) and butadiene (21 g), thereby carrying out a tertiary reaction. After the butadiene reaction was completed, styrene (33 g) was added to the reaction mixture, to thereby terminate the polymerization. Finally, 2,6-di-t-butyl-4-methyl phenol (BHT) (2.03 mmol) was added to the reaction mixture, to thereby terminate the reaction.

GPC analysis revealed that a styrene-butadiene-styrene block copolymer (A-B-A') having a weight average molecular weight of 112,000 and a molecular weight distribution (MWD) of 1.041 was 79.5 weight %, and a butadiene-styrene block copolymer (B'-A') having a maximum peak molecular weight (Mp) of 95,000, 40,000 and 27,000, respectively, and a total molecular weight distribution (MWD) of 1.219 was 20.5 weight %.

H-NMR analysis revealed that the content of styrene was 31.0 weight %.

Preparation Example 4

Cyclohexane (1,000 g), tetrahydrofuran (0.15 g) and styrene (27 g) were added to a 2 L stainless reactor under nitrogen atmosphere. After the reactor was heated to 35° C., n-butyllithium (1.62 mmol) was added thereto, and then, the reaction mixture was subjected to an adiabatic heat rise reaction. Five minutes after the maximum reaction temperature was reached, n-butyllithium (0.101 mmol) and butadiene (105 g) were successively added to the reaction mixture to perform a primary reaction. Next, n-butyllithium (0.303 mmol) and butadiene (35 g) were successively added thereto to perform a secondary reaction. After the butadiene reaction was completed, styrene (33 g) was added to the reaction mixture, to thereby terminate the polymerization. Finally, 2,6-di-t-butyl-4-methyl phenol (BHT) (2.03 mmol) was added to the reaction mixture, to thereby terminate the reaction.

GPC analysis revealed that a styrene-butadiene-styrene block copolymer (A-B-A') having a weight average molecular weight of 110,000 and a molecular weight distribution (MWD) of 1.033 was 81.5 weight %, and a butadiene-styrene block copolymer (B'-A') having a maximum peak molecular weight (Mp) of 94,000 and 34,000, respectively, and a total molecular weight distribution (MWD) of 1.155 was 18.5 weight %.

H-NMR analysis revealed that the content of styrene was 30.8 weight %.

Comparative Preparation Example 1

Cyclohexane (1,000 g), tetrahydrofuran (0.15 g) and styrene (60 g) were added to a 2 L stainless reactor under nitrogen atmosphere. After the reactor was heated to 35° C., nbutyllithium (3.64 mmol) was added thereto, and then, the reaction mixture was subjected to an adiabatic heat rise reaction. Five minutes after the maximum reaction temperature was reached, butadiene (140 g) was added thereto, to perform the polymerization. Five minutes after the maximum reaction temperature was reached during the butadiene polymerization, dichlorodimethylsilane (1.6 mmol) was added to the reaction mixture, to carry out the coupling reaction. After the polymerization was completed, 2,6-di-t-butyl-4-methyl phenol (BHT) (0.73 mmol) was added to the reaction mixture, to thereby terminate the reaction.

GPC analysis revealed that a styrene-butadiene-styrene block copolymer (A-B-A') having a weight average molecular weight of 110,000 and a molecular weight distribution (MWD) of 1.035 was 81.2 weight %, and a butadiene-styrene block copolymer (B'-A') having a maximum peak molecular weight (Mp) of 55,000 and a molecular weight distribution (MWD) of 1.029 was 18.8 weight %.

H-NMR analysis revealed that the content of styrene was 30.5 weight %.

Comparative Preparation Example 2

Cyclohexane (1,000 g), tetrahydrofuran (0.15 g) and styrene (30 g) were added to a 2 L stainless reactor under nitrogen atmosphere. After the reactor was heated to 35° C., nbutyllithium (1.82 mmol) was added thereto, and then, the reaction mixture was subjected to an adiabatic heat rise reaction. Five minutes after the maximum reaction temperature was reached, butadiene (140 g) was added thereto, to perform the polymerization. When the butadiene polymerization was completed, styrene (30 g) was added to the reaction mixture, to carry out the polymerization. After the polymerization was completed, 2,6-dit-butyl-4-methyl phenol (BHT) (11.83 mmol) was added to the reaction mixture, to thereby terminate the reaction.

GPC analysis revealed that a styrene-butadiene-styrene block copolymer (A-B-A') having a weight average molecular weight of 108,000 and a molecular weight distribution (MWD) of 1.040 was 81.2 weight %, and there was no butadiene-styrene block copolymer (B'-A').

H-NMR analysis revealed that the content of styrene was 30.6 weight %.

Examples 1-4 and Comparative Examples 1-2

Preparation of Adhesive Composition

Each block copolymer prepared in Preparation Examples 1-5 and Comparative Preparation Examples 1-2 was added to a stainless container together with an adhesive resin, a plasticizer and an antioxidant and stirred at a temperature of 140 to 150° C. for 3 hours, to thereby obtain a completely hot-melt sticky adhesive.

Mechanical properties of the adhesives obtained above were measured according to liquid viscosity and adhesiveness measurement methods, and the results are shown in Table 2.

TABLE 1

| Composition | Brand name | Manufacture | Content (parts by weight) |
|---|---|---|---|
| Block copolymer | Prep. Ex. 1-5, Comp. Ex. 1-2 | Laboratory preparation | 20 |
| Adhesive resin | Escorez 5600 | Exxon | 50 |
| Plasticizer(oil) | White oil 2150 | Michang Oil Ind. Co., Ltd. | 30 |
| Antioxidant | Irganox 1010 | Ciba Specialty Chemicals | 0.5 |

TABLE 2

| | | Prep. Ex. 1 | Prep. Ex. 2 | Prep. Ex. 3 | Prep. Ex. 4 | Comp. Prep. Ex. 1 | Comp. Prep. Ex. 2 |
|---|---|---|---|---|---|---|---|
| A-B-A' triblock | weight average molecular weight | 110,000 | 110,000 | 112,000 | 111,00 | 110,000 | 108,000 |
| | Content (weight %) | 81.0 | 80.3 | 79.5 | 81.5 | 81.2 | 100 |
| | MWD | 1.031 | 1.039 | 1.041 | 1.033 | 1.035 | 1.040 |
| B'-A' diblock | Max. peak molecular weight | 93,000/ 52,000/ 30,000 | 93,000/ 60,000/ 37,000 | 95,000/ 40,000/ 27,000 | 94,000/ 34,000 | 55,000 | — |
| | Content (weight %) | 19.0 | 19.7 | 20.5 | 18.5 | 18.8 | — |
| | MWD | 1.201 | 1.128 | 1.219 | 1.155 | 1.029 | — |
| Styrene content (weight %) | | 30.2 | 30.3 | 31.0 | 30.8 | 30.5 | 30.6 |

| | | Ex. 1 | Ex. 2 | Ex. 3 | Ex. 4 | Comp. Ex. 1 | Comp. Ex. 2 |
|---|---|---|---|---|---|---|---|
| Brookfield viscosity (cps, S31) | 120° C. | 14,800 | 14,300 | 14,400 | 15,000 | 17,500 | 22,500 |
| | 140° C. | 5,900 | 5,500 | 5,700 | 6,100 | 7,300 | 9,700 |
| | 160° C. | 2,800 | 2,400 | 2,600 | 3,000 | 4,400 | 5.200 |
| Softening point (° C.) | | 106 | 107 | 109 | 108 | 107 | 110 |
| Loop tack (g/in) | | 3,120 | 3,440 | 3,350 | 3,020 | 2,760 | 2,410 |
| 180° Peel strength (g/in) | | 1,720 | 1,730 | 1,710 | 1,740 | 1.730 | 1,790 |
| Holding power (min.) | | 410 | 410 | 400 | 420 | 410 | 420 |

As described in Table 2, it has been found that the styrene-butadiene-styrene block copolymers (Preparation Examples 1-4) that include two or more maximum peak molecular weights (Mp) of the butadiene-styrene block copolymer (B'-A') showed a wide molecular weight distribution (MWD=1.155-1.219). In case of applying the styrene-butadiene-styrene block copolymers (Preparation Examples 1-5) to a hot-melt adhesive, it exhibited lower Brookfield viscosity than the copolymers of Comparative Preparation Example 1 (in which the unreacted butadiene-styrene block copolymer (B'-A') having one half of the molecular weight was remained) and Comparative Preparation Example 2 (which did not include the butadiene-styrene block copolymer (B'-A')), which was favorable in terms of adhesive processability, and showed excellent adhesive properties, in particular, loop tack.

The invention claimed is:

1. An adhesive composition comprising:
   a block copolymer consisting of a triblock (A-B-A') and a diblock (B'-A') represented by the following Formula I,
   a hydrocarbon adhesive resin, and
   a plasticizer

[A-B-A']n[B'-A']m     [1]

wherein A and A' are vinyl aromatic monomer polymers, B and B' are conjugated diene polymers,
   n and m are independently a weight average mixed ratio of a triblock [A-B-A'] and a diblock [B'-A'] (here, n+m=100 weight %, and n≧m, m≧1), wherein the weight average molecular weight of the diblock is smaller than that of the triblock and is larger than that of A constituting the triblock, wherein the molecular weight distribution (MWD) of the diblock is larger than 1.1 and smaller than 2.0, wherein the diblock has two or more peak molecular weights (Mp).

2. The adhesive composition according to claim 1, wherein the adhesive resin is used in the amount of 100 to 400 parts by weight based on 100 parts by weight of the block copolymer.

3. The adhesive composition according to claim 1, wherein the plasticizer is used in the amount of 10 to 200 parts by weight based on 100 parts by weight of the block copolymer.

4. The adhesive composition according to claim 1, wherein m is in the range of $1 \leqq m \leqq 50$.

5. The adhesive composition according to claim 1, wherein the vinyl aromatic monomer is selected from the group consisting of styrene, α-methylstyrene, p-methylstyrene, o-methylstyrene, p-tert-butylstyrene, dimethylstyrene, vinyltoluene, vinylxylene, diphenylethylene, vinyl naphthalene and mixtures thereof.

6. The adhesive composition according to claim 1, wherein the conjugated diene is selected from the group consisting of butadiene, isoprene and mixtures thereof.

7. The adhesive composition according to claim 1, wherein the weight average molecular weight of the triblock is in the range of from 20,000 to 400,000.

8. The adhesive composition according to claim 1, wherein the weight average molecular weight of A, which constitutes the triblock, is in the range of from 5,000 to 100,000.

9. The adhesive composition according to claim 1, wherein the content of the vinyl aromatic monomer in the diblock is in the range of from 5 to 95 weight %.

* * * * *